Aug. 21, 1956   C. L. SCHULTE   2,760,048
SHADOWLESS PHOTOGRAPHIC LIGHT
Filed March 11, 1953   2 Sheets-Sheet 2

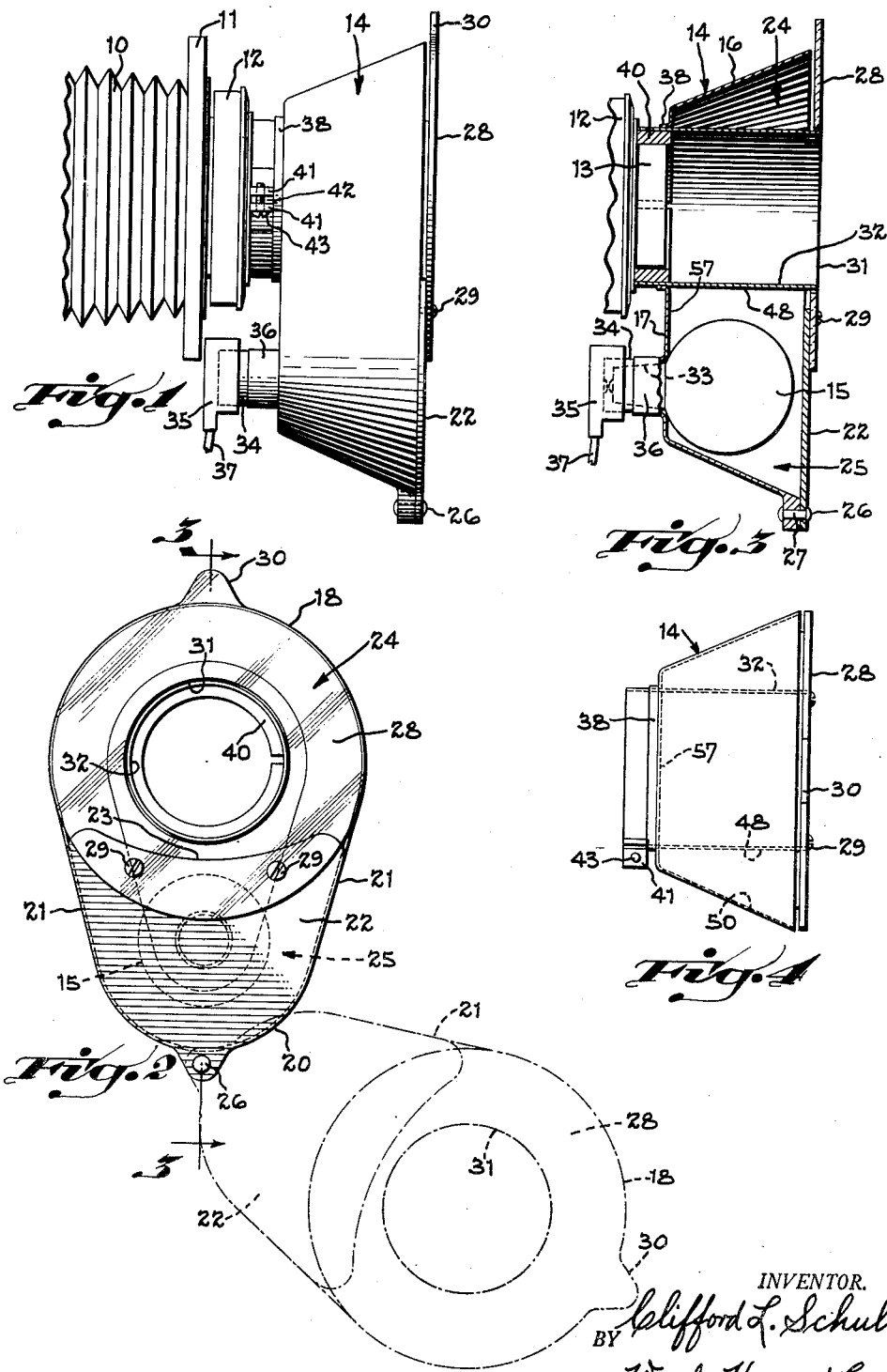

INVENTOR.
Clifford L. Schulte.
BY
Wood, Herron & Evans.
ATTORNEYS.

United States Patent Office

2,760,048
Patented Aug. 21, 1956

2,760,048
SHADOWLESS PHOTOGRAPHIC LIGHT

Clifford L. Schulte, Cincinnati, Ohio

Application March 11, 1953, Serial No. 341,737

4 Claims. (Cl. 240—1.3)

This invention relates to lighting equipment for shadowless photographic work and has particular reference to a light having a reflector which is arranged to be mounted in a position at least partially concentric to a camera lens, and adapted to project a light beam outwardly and forwardly from the proximity of the lens generally along the lens axis.

By the term "shadowless photography" is meant the technique of taking photographs by projecting artificial light upon the subject along lines which emanate, as closely as possible, from the center of the camera lens so as to eliminate shadows. Since it is impossible to project light from the lens center itself, the next best solution is to project it forwardly from an area concentric to and in close proximity to the periphery of the lens.

Lamp structures intended for shadowless photography have been proposed in the past in which a ring-shaped lamp tube is arranged to encircle the camera lens barrel, such that the lamp tube itself projects direct light rays outwardly from an annular area surrounding the lens, as distinguished from reflecting the rays indirectly.

A primary object of the present invention has been to provide a reflector type lamp which utilizes the standard low cost photographic bulbs as a light source and which projects a high intensity cone shaped light beam forwardly and outwardly from an annular reflecting area which is concentric to and which completely surrounds the camera lens; thus the light provides a reliable and inexpensive source of illumination for shadowless photography without resorting to special light sources.

Direct, shadowless lighting has a number of highly significant photographic advantages over the conventional side lighting techniques which employ flash guns or flood lamps. These advantages are realized both in black and white and in color photography, particularly in special fields as explained in detail later. The present light is intended to utilize ordinary flash bulbs of the several commercial grades and also photographic flood lamp bulbs which provide continuous, high intensity lighting; thus the present light is usable either for flash or for time exposures according to the type or field of use.

The term "bulb" or "lightbulb," used throughout the specification and claims, refers to any single source of light and particularly to the various commercial photographic light bulbs, either the flash or continuous flood type. Such bulbs have a lighting element enclosed in a generally spherical glass envelope which includes a mounting base interfitting an electrical socket.

Analyzed to its simplest concept, the present photographic light comprises an open, dish-like reflector shell having a baffle tube surrounding the camera lens and having an oval periphery providing one arcuate portion spaced outwardly from and concentric to the tube and forming an annular reflector, the oval reflector shell having a second arcuate portion and baffle plate enclosing a generally spherical light bulb and forming a light chamber which is displaced a substantial distance laterally from the axis of the lens. The reflector shell and external surface of the baffle tube have reflecting surfaces adapted to direct the light rays laterally from the light chamber toward the lens axis, then outwardly in the general direction of the lens axis, and the baffle tube is adapted to exclude stray light rays from the lens.

Otherwise expressed, the reflector shell and its baffle tube cooperate to reflect at predetermined angles the light rays emitted in all directions from the light bulb, reform them into the cone shaped light beam and project the beam forwardly from the camera lens toward the subject. The reflector shell thus acts as a converter for ordinary bulbs, making it possible to mount the bulb at a point remote from the lens, such that there is no interferences with the lens angle or field of view. From the practical aspect, the photographic lamp is a self-contained unit which may be applied to any standard camera without electrical or mechanical changes, and is conveniently substituted for the usual flash gun or flood lamp arrangement to provide shadowless photography.

Another object of the invention has been to provide a baffle tube arrangement which cooperates both with the reflector shell and with the camera lens to provide two functions; first to prevent light rays which emanate from the bulb from passing directly from the reflector shell into the lens or upon the subject being photographed, and secondly, to provide an external cylindrical reflector which cooperates with the internal surface of the reflector shell in deflecting the light rays and forming the cone-shaped light beam of reflected rays.

For this purpose, the baffle tube extends forwardly from the lens barrel of the camera through the reflector to the open face of the shell and has an internal surface finished in dull black for light absorption, while its external cylindrical surface is polished to provide the cylindrical light reflector which is concentric to the first named arcuate portion of the oval reflector shell. The light rays thus project laterally from the light chamber to the reflecting surfaces of the reflector shell and strike the reflecting surfaces of the shell and baffle tube before being projected outwardly.

A further object of the invention has been to provide a photographic light which forms a self-contained unit and in which the baffle tube serves as the means for mounting the light upon the lens barrel of the camera.

The reflector shell is generally concave, its oval face configuration being delineated by a side wall which diverges outwardly from a relatively flat back wall. The baffle tube projects rearwardly through the back wall and forwardly to the plane of the open face of the reflector shell, the rearward end of the tube being adapted to be telescopically inserted and clamped upon the lens barrel. The light bulb, which is displaced laterally from the lens axis, is mounted in a socket in the light chamber which also projects rearwardly through the back wall of the reflector shell.

The light chamber prevents the light rays from projecting directly from the bulb outwardly and is formed by a baffle plate which extends across the open face of the reflector shell at its second arcuate portion. The baffle plate terminates in a curved outer edge which partially delineates the annular reflecting area extending around the baffle tube. The inner surface of the baffle plate has a polished reflecting surface arranged to reflect light rays from the chamber outwardly toward the baffle tube and reflecting surfaces of the shell.

The baffle plate is pivotally mounted upon the shell adapting it to be swung to one side to permit replacement of the bulb. The plate preferably includes a transparent shield ring which normally overlies the annular area of the reflector which surrounds the baffle tube, the outer end of the baffle tube being open. The shield ring may be suitably tinted or frosted, such that the light quantity or quality projected outwardly from the reflector shell may be controlled, while the rays reflect directly back from the subject, through the open center of the shield ring and through the baffle tube to be focused by the lens upon the film in the camera.

In the preferred arrangement disclosed in this application, the light chamber conceals the light bulb completely so that only reflected light is permitted to escape and fall upon the subject being photographed with no direct rays reaching the subject. This provides even distributing of the light and improves the quality of the photograph.

Various other features and advantages of the invention will be apparent to those skilled in the art from the following detailed description, taken into conjunction with the drawings.

In the drawings:

Figure 1 is a fragmentary side view of the forward portion of a camera, illustrating the photographic light mounted upon the end portion of the lens barrel.

Figure 2 is a face view of the light, with the open position of the baffle plate and transparent shield ring indicated in broken lines.

Figure 3 is a sectional view taken on line 3—3, Figure 2, detailing the internal construction of the light.

Figure 4 is a side view of the light as projected from Figure 3.

Figure 5:
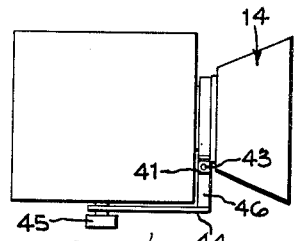
Figure 5 is a diagrammatic view showing the light attached to a camera by a mounting bracket as distinguished from the lens barrel mounting shown in Figure 1.

Described generally with reference to Figure 1, the light-proof bellows of a conventional camera is indicated at 10 and includes a lens mounting plate 11 at its forward end upon which is mounted a shutter housing 12. A lens barrel, indicated at 13 in Figure 3, projects outwardly from the shutter housing and encloses the camera lens. In the structure shown in Figures 1 to 4, the light assembly is mounted directly upon the outer end portion of the lens barrel, whereas the structure shown in Figure 5 illustrates the use of a separate mounting bracket. The bracket is used for mounting the light upon cameras which are not provided with an external lens barrel, such as the standard box type camera. The construction of both mounting means is explained in detail later. It will be understood that the detailed construction of the shutter and lens barrel is not pertinent to the invention and has been omitted from the disclosure.

It will be understood that the lamp assembly shown in the drawings represents a one embodiment of the invention in which the lamp is fabricated from sheet metal parts. It is contemplated however, to construct the lamp from other materials and, in some instances, to mold the shell and baffle tube as an integral unit. By way of example, the reflector shell and baffle tube may be molded from suitable plastic material such as thermoplastic, with the bulb socket formed of metal and molded in as an insert. In order to provide the reflecting surfaces, the plastic may be coated or impregnated with a suitable electric conducting material such as graphite. In this event, a metallic reflecting surface is applied by the electro-plating process and the surface buffed and polished in the usual way.

In the disclosed embodiment of the invention, the reflector shell, which forms the lamp casing, comprises a sheet metal stamping indicated generally at 14, having a suitable internal surface finish and polish as described later. The stamping 14 encloses and supports the various components including the light source 15 which may consist of any one of several commercial flash bulbs or flood lamps.

Figure 8:
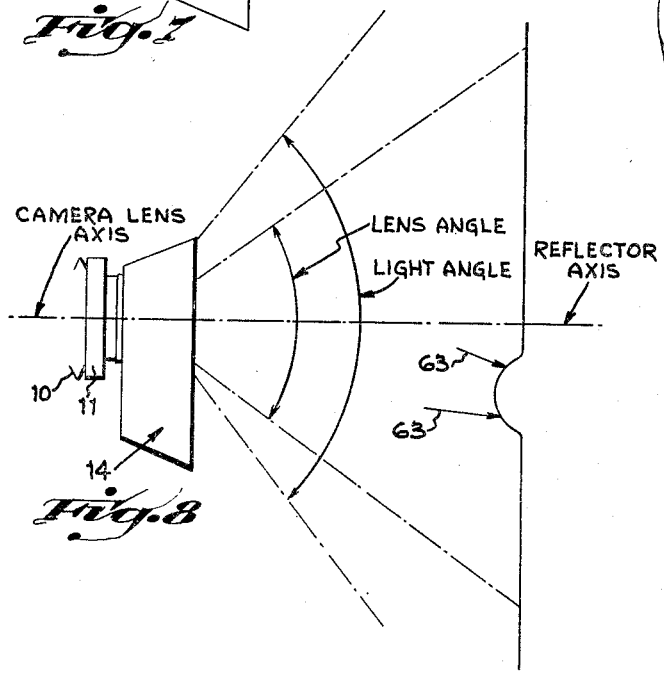
Figure 8 is a diagrammatic view illustrating the light cone projected from the reflector and its relationship to the lens angle of the camera.

As explained later in detail, the reflector is generally dish-shaped or concave and its internal reflecting surface consists of a geometric arrangement of planes and curves adapted to project a cone of light forwardly, the light rays being projected from points generally concentric to the lens of the camera. As indicated in Figure 8, the longitudinal axis of the cone of light is projected forwardly in the direction of the principal axis of the camera lens such that the light rays strike the surface of the subject and reflect directly back into the camera lens.

As viewed in Figure 2, the reflector has a generally oval face configuration in the plane which is transverse to its longitudinal axis. The face configuration is delineated by the outer edge of a peripheral wall 16 which diverges outwardly from a flat rear wall 17 toward the open face of the reflector shell. The divergence or outward inclination of wall 16 preferably is uniform about the entire periphery and the shell, as viewed in Figures 1 and 4, forms a partial cone.

Upon reference to Figure 2, it will be noted that the oval face configuration of the reflector shell has a major circular arc indicated at 18 and a minor circular arc 20, with the two arcs joined by side wall sections indicated at 21—21. By virtue of the outward inclination of the peripheral wall, the internal surface of the wall, both in the curved and straight portions, forms a generally concave reflecting surface which extends downwardly to the flat rear wall 17.

It will be noted that the major circular arc 18 is generally concentric to the axis of the camera lens and that the minor arc 20 is generally concentric to the source of light or bulb 15. It will also be noted that an opaque baffle plate 22 extends across the curved open end of the reflector shell in the area of the minor arc to prevent the direct emission of light rays from the light source. The baffle extends toward the major circular arc and has its outer edge curved as at 23. This curvature partially complements the major radius and thus delineates a ring-shaped or annular reflecting area surrounding the lens barrel of the camera, as indicated generally at 24, suitable to project the cone of light. The portion of the shell which is enclosed by the baffle plate 22 forms a light chamber indicated generally at 25 which is open to the annular light reflecting area 24.

Figure 9:
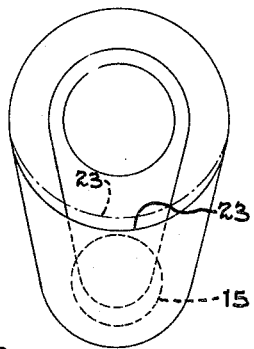
Figure 9 is a diagrammatic face view showing a slightly modified reflector structure.

As indicated diagrammatically in Figure 9, the shield curve 23 may be modified to form an arc which is centered upon the major arc of the shell so as to provide a truly circular annular light reflecting area. It will be understood at this point, that the baffle or shield 22 completely overlies the light source 15 and that the curve 23, as shown in Figure 2, is developed to prevent "hot spots" or areas having excess light intensity from being projected from this area, which is in close proximity of the bulb. The curve 23 is a critical factor and the modified curves indicated in Figure 9 are adapted to vary this portion of the annular reflector area so as to accommodate the reflector to light bulbs of different types or intensities. In other words, to provide a fairly uniform light cone, the opening is decreased for bulbs of greater intensity and increased for bulbs of lower intensity.

Referring to Figures 2 and 3, it will be noted that the baffle 22 is pivotally connected as at 26 to a lug 27 forming a part of the reflector shield. This permits the baffle plate and transparent shield 28, which is attached to it, to be swung to the open position indicated in broken lines in Figure 2 for replacing the light bulb 15. The transparent shield 28 is attached to the baffle by means of a pair of machine screws 29—29 and the shield is provided with a thumb tab 30 extending outwardly for convenience in shifting it to open and closed positions.

The transparent shield is in the form of a ring having an outside diameter which corresponds to the major circular arc of the reflector shell and having a central opening 31 which has a diameter slightly larger than the cylindrical baffle tube 32. It will be seen in Figure 3 that the shield is locked in closed position by engagement of its central opening 31 with the outer end of the baffle tube, and that the shield is disengaged by springing it forwardly. The shield thus encloses completely the annular reflecting area 24 and if necessary, diffuses the light rays or filters them, as explained later. It will be apparent that the light rays emanating from the reflecting surfaces of the annular reflector area 24 pass outwardly through the transparent shield and that the rays which are reflected back from the object to be photographed pass through the open baffle tube to the camera lens.

The purpose of the baffle tube 32 is to prevent light rays from the bulb from being deflected by the reflector itself directly to the camera lens. For this purpose, the internal surface of the cylindrical tube is finished in dull black light absorbing material. The tube therefore, completely protects the lens from light rays emitted by the bulb and reflecting surfaces and also prevents external reflected rays from being deflected from the internal surface of the tube and through the lens to the film in the camera.

As explained later with reference to the diagrammatic views, the internal surface of baffle plate 22, the internal surfaces of the reflector shield and the external surfaces of the baffle tube are all provided with highly polished light reflecting surfaces which are suitable to reflect the light rays from the bulb laterally and forwardly along the axis of the lens in the form of a cone from points concentric to the baffle tube and lens.

In order to accommodate the reflector unit to the standard techniques used in photography, several interchangeable transparent shield rings 28 are furnished with each light unit. By way of example, the standard daylight color film is color balanced and can be exposed under natural daylight or under artificial light which has a blue tint. When using color film for indoor work, the photographer either uses a bulb which is provided with a blue tint or uses a white bulb and attaches a blue tinted shield ring to the baffle plate by means of the screws 29.

The shield rings are also provided in clear transparent material for intense light or with a frosted surface to provide a diffused light. The shield rings may be formed of clear plastic material properly tinted or surface treated, or if desired, they may be formed of glass having the same characteristics.

From the foregoing, it will be understood that the baffle plate and shield ring perform several functions in reflecting and projecting the light rays laterally from the bulb and forwardly from the annular reflecting area. In addition, these parts provide an enclosure which prevents particles of glass from being propelled outwardly from exploding flash bulbs. Although many commercial bulbs are surface treated to prevent bursting, nevertheless, this treatment is not entirely dependable and bulbs occasionally explode and shatter upon being fired.

Referring to Figure 3, it will be noted that the bulb 15 includes a base 33 which fits into a socket 34, with a terminal plug 35 inserted upon the outer end of the socket. The socket 34 is fixed within a sleeve 36 which forms a part of the flat rear wall 17. An electrical cable 37 conducts the electric current through the plug to the base of the bulb. The socket 34 is of standard construction and is known in the industry as a bayonet type, being provided with a slot which engages a pin projecting radially from the lamp base, similar to the base of an automobile lamp. The terminal plug 35 is also of standard construction and provides a direct electrical contact with a central terminal formed on the base, the second contact being made with the metal shell which forms the socket 34, and from the socket to the lamp base. The socket and terminal plug are not disclosed in detail since this structure is commercial and is not particularly relevant to the invention.

It will be understood that the cable 37 represents the power source for flash bulbs or for continuous flood lamps. In utilizing flash bulbs, the cable is in electrical connection with the flash gun or high voltage strobe unit and is arranged to fire the bulb in synchronism with the camera shutter according to conventional practice. It will be understood therefore, that the present reflector unit may be installed upon the conventional camera with no changes in structure or in the electrical circuit. For ordinary flash bulbs, the light unit simply replaces the standard concave reflector which is normally mounted upon the flash gun itself.

As best shown in Figure 3, the baffle tube 32 passes through an opening formed in the rear wall of the reflector shell, the opening being provided with an outwardly turned flange 38 embracing the external surface of the tube. The tube is permanently attached by spot welding or brazing to the flange to provide a secure and rigid attachement. It will be noted that the tube extends forwardly in flush relationship with the outer edge of wall 16 and that its inner end projects beyond the rear wall toward the camera for attachment to the lens barrel.

In order to accommodate the baffle tube to the various lens barrels, a split adaptor bushing 40 is interposed between the baffle tube and lens barrel. Commercial lens barrels are furnished in a number of standard diameters and in order to adapt the lamp unit to all of them, adaptor bushings having several suitable inside diameters are utilized. Upon purchasing a reflector unit, an adaptor bushing is furnished which has an inside diameter equal to the diameter of the lens barrel upon which the unit is to be mounted. The bushings are preferably formed of dielectric material to insulate the reflector shell from the lens barrel. This prevents the base of the bulb from being grounded and eliminates accidental firing of the bulb in the event the electrical cable terminals are reversed.

Upon installation, the bushing is inserted upon the lens barrel and the baffle tube is then slipped over the bushing and clamped in position. For this purpose, end portion of the baffle tube is provided with a pair of ears 41—41 and the wall of the tube is slotted between the spaced ears as at 42. A clamping screw 43 passes through the ears and is threaded into one of them so as to draw the ears toward one another when the screw is tightened. This contracts the end of the baffle tube and bushing and provides a rigid clamping engagement upon the lens barrel.

As indicated above, the reflector unit is also arranged to be mounted upon cameras which have no protruding lens barrel, such as the ordinary box camera. For this purpose, mounting bracket 44 is utilized, as shown in Figure 5. The bracket is attached to the bottom of the camera by a knurled screw 45 which is threaded into a tapped hole normally used for mounting the camera upon a tripod. The forward end of the bracket is bent upwardly to provide the vertical limb 46 which supports the reflector unit. In this mounting arrangement, the ears 41—41 straddle the upper end of limb 46 which is provided with a hole to receive the screw 43. Thus when the screw is tightened, the light unit is firmly attached to the end of the bracket for support. The bracket is arranged to support the light with the baffle tube in alignment with the axis of the lens and with the rearward end of the tube in contact with the front wall of the camera.

Figure 6:
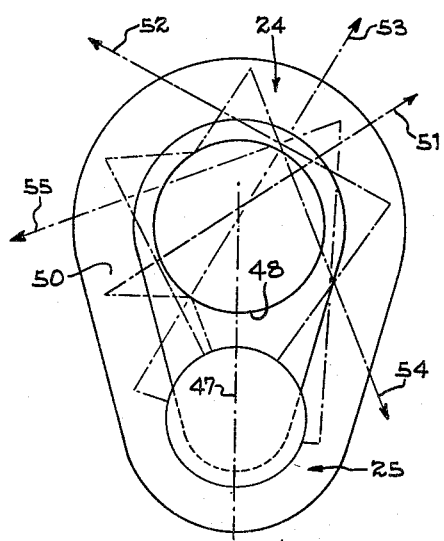
Figure 6 is a diagrammatic face view indicating the reflecting action of the reflector shell and baffle tube with respect to the light source.

As explained, earlier the bulb 15 is intended to represent any suitable light source, such as a flash bulb or a flood light bulb. It will be understood that the reflecting principles of the invention, as explained below, apply to any type of lighting, either flash or continuous, since the location of the light source is always the same. The polished surfaces of the reflector shell, baffle plate and baffle tube are coordinated with one another to form a compound light reflector system suitable to reflect the light rays laterally and project the cone shaped light beam outwardly. As shown in Figure 6, the light bulb and camera lens are both centered upon the major axis 47 of the oval faced reflector shell. The light rays emanating in all directions from the bulb are projected both directly and indirectly in a lateral direction from the light chamber 25 toward the annular reflector surfaces surrounding the baffle tube. Some of the rays pass directly from the bulb laterally toward the annular reflector and are reflected outwardly, while other rays reflect in many directions before being projected outwardly. It will be understood that the various reflecting surfaces are related to one another and to the opening to provide substantially equal light intensity throughout the cone.

Referring to Figure 6, it will be seen that a certain percentage of the total light rays pass directly from the bulb to the cylindrical reflecting surface 48 of the tube then to the reflecting surface 50 of the diverging wall before passing outwardly through the ring-shaped shield. These rays are exemplified by the arrow 51. Other rays pass directly from the bulb to the surface 50 then outwardly as indicated at 52 and 53. Many other rays are reflected several times as indicated at 54 and 55 before passing outwardly. It will be seen therefore, that the rays are deflected in all directions as viewed in the plane of the deflector to provide uniform dispersion and that the angles of incidence and reflection are related to one another so as to form the cone shaped beam as shown in Figures 7 and 8.

Figure 7:
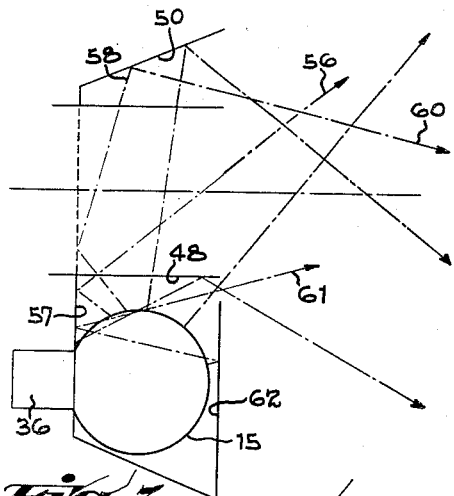
Figure 7 is a diagrammatic view of the structure shown in Figure 3, showing the reflection of the light rays relative to the longitudinal axis of the reflector.

It will be seen in Figure 7, that certain light rays, as indicated at 56, are projected from the bulb directly to the reflecting surface 57 of the back wall then outwardly and that other rays 58 deflect from surface 57 to surface 50 to be deflected outwardly as indicated at 60. It will also be noted that certain rays 61 strike the reflecting surface 62 of the light chamber before being deflected outwardly. Although there are probably some losses due to light absorption, substantially all of the light wave energy is eventually projected outwardly into the cone.

It will be seen in the diagrams (Figures 6–9) that the light chamber and baffle tube are relatively positioned to conceal the bulb and that only reflected light is projected upon the subject being photographed. In practice, it is found that this principle creates a more even distribution of light; in other words, direct or fill-in rays, intermingled with reflected rays, create localized light patches or hot spots which detract from the quality of the resulting photograph. Moreover, by enclosing the bulb, the reflector structure affords protection against flying fragments of glass from exploding flash bulbs.

Standard camera lenses have various lens angles depending upon their intended service, those having a maximum included angle being known as "wide angle lenses". The lens angle represents the maximum field of view, and as indicated in Figure 8, the present photographic light provides a light angle which exceeds the maximum lens angle. This provides uniform light intensity upon the subject which extends beyond the edges of the lens field. Since the lens axis and reflector axis are in alignment as indicated, the light rays within the cone are reflected from the subject directly back into the camera lens.

As indicated at 63 in Figure 8, the angle of incidence is such that all raised areas on the subject are exposed to the light rays and will reflect light back toward the camera lens. Otherwise expressed, the profile face of the subject to be photographed is lighted at all points whether the slopes of the profiles face inwardly toward the lens axis or outwardly away from the axis. This provides substantially uniform shadowless lighting and the resulting photograph is free of deep shadows but is not characterized by a flatness effect. In other words, the depth of the resulting photograph is substantially the same as it would be under ordinary light because the depth effect is created by the falling-off of light intensity as the distance from the light source increases. This is true whether the subject is exposed to ordinary side lighting with cross shadows or to shadowless light with no cross shadows. Experimental work also illustrates that the direct light cone has no adverse effect on definition, that is, the ability of the lens to bring out small detail.

For these reasons, the present light unit is well adapted to portrait photography since it reduces or excludes from the photograph the shadows defining wrinkles and other dark areas. This decreases or eliminates entirely the need for retouching. The light is equally advantageous in color photography, since it eliminates false colors which are produced by shadows and poorly lighted surfaces. In this respect, it is particularly beneficial in color medical photography, because true colors and absence of shadows are highly important factors in this field. The absence of shadows also highly important in group photography whether in color or not, since under ordinary cross lighting, a shadow cast by one person may fall upon others of the group to partially or completely obscure that portion of the photograph.

From the foregoing, it will be understood that the present light unit is utilized with the ordinary camera without requiring any special operating skill or equipment. Moreover, it converts the camera to the shadowless technique without requiring special ring type bulbs or other concentrically arranged light sources. This reduces costs, especially in connection with the use of flash bulbs which must be replaced with each exposure. The structure thus provides a highly practical and convenient light converter which lends itself to efficient use in virtually all fields of photography.

Having described my invention I claim:

1. A photographic light adapted to be mounted at the front of a camera relative to the lens and arranged to reflect light rays from a generally spherical light bulb to the subject being photographed, the reflected rays being projected forwardly from points at least partially concentric to the lens, said photographic light comprising, a reflector member having an elongated face configuration and having a light reflecting surface, said face configuration being delineated by a peripheral side wall, said side wall having an internal light reflecting surface, a cylindrical baffle tube extending through said reflector along an axis transverse to the plane of the face of the reflector member, said tube having an external light reflecting surface providing a cylindrical reflector, said cylindrical tube adapted to project forwardly from the lens of a camera and generally concentric to the axis of the lens, a portion of said side wall being generally concentric to said cylindrical baffle tube and spaced outwardly therefrom and providing an annular reflecting area, the said generally spherical light bulb being mounted in said reflector member in a position displaced laterally to one side of said cylindrical baffle tube and adapted to project light rays upon the reflecting surfaces of the cylindrical baffle tube and reflector member, a baffle plate extending across an end portion of the elongated face of the reflector member and covering said light source, said reflecting surfaces facing toward one another and adapted to reflect light rays which emanate from the light source and to project said rays from said annular reflecting area forwardly and generally along the axis of the camera lens, said reflector member, baffle plate, and baffle tube forming a partial enclosure about the light bulb effective to eliminate the projection of direct light rays from the bulb to the subject being photographed, whereby the subject is illuminated only by said reflected rays.

2. A photographic light reflector adapted to be mounted at the front of a camera relative to the lens aperture to reflect light rays forwardly along the axis of the lens from a light bulb to the subject being photographed, the reflected rays being projected from points surrounding the lens, said photographic light reflector comprising, an elongated reflector shell having a rear wall and having a side wall extending outwardly from the periphery of said rear wall and delineating an open face, said rear wall and side wall having internal light reflecting surfaces, an open baffle tube projecting outwardly from said rear wall and adapted to coincide with the lens aperture, said baffle tube being located in an endwise portion of the elongated reflector shell, said reflector shell having a reflecting area surrounding the baffle tube and projecting light rays outwardly toward the subject, the side wall at said endwise portion of the shell being substantially concentric to the axis of said baffle tube and spaced outwardly from the periphery of the tube, thereby providing one portion of said reflecting area which surrounds the baffle tube, a baffle plate extending across the open face of the elongated reflector shell at an endwise portion thereof opposite said first mentioned endwise portion, said plate having an edge spaced from the baffle tube, a spherical light bulb mounted in said endwise portion of the shell behind said baffle plate, said baffle plate overlying and concealing the light bulb and delineating a light chamber which communicates with the reflecting area surrounding the baffle tube, said light bulb projecting light rays laterally to the light reflecting area surrounding the baffle tube, said reflecting area projecting the reflected rays forwardly and generally along the axis of the baffle tube and lens, said reflector shell, baffle tube and baffle plate forming an enclosure about the light bulb eliminating the projection of direct rays from the bulb, whereby the subject being photographed is illuminated only by said reflected rays.

3. A photographic light reflector adapted to be mounted at the front of a camera relative to the lens aperture to reflect light rays forwardly along the axis of the lens from a light source to the subject being photographed, the reflected rays being projected from points surrounding the lens, said photographic light reflector comprising, an elongated reflector shell having a rear wall and having a side wall extending outwardly from the periphery of said rear wall and delineating an open face, said rear wall and side wall having internal light reflecting surfaces, an open cylindrical baffle tube projecting outwardly from said rear wall and adapted to project forwardly from the lens aperture, said baffle tube being located in an endwise portion of the elongated reflector shell, said tube having an external light reflecting surface, said reflector shell having a reflecting area surrounding the baffle tube and projecting light rays outwardly toward the subject, the side wall at said endwise portion of the shell passing around the baffle tube and spaced outwardly from the periphery of the tube, thereby providing one portion of said reflecting area which surrounds the baffle tube, a light shield extending across the open face of the elongated reflector shell at an endwise portion thereof opposite said first mentioned endwise portion, said shield having an edge spaced from the baffle tube, the internal surface of the light shield having a light reflecting surface, a light source mounted in said endwise portion of the shell behind said light shield, said shield overlying and concealing the light source and delineating a light chamber which communicates with the reflecting area surrounding the baffle tube, said light source projecting light rays laterally to the light reflecting area surrounding the baffle tube and to the external reflecting surface of the baffle tube, said reflecting area projecting the reflected rays forwardly and generally along the axis of the baffle tube and lens, said reflector shell, baffle tube and baffle plate forming an enclosure about the light source eliminating the projection of direct rays from the light source, whereby the subject being photographed is illuminated only by said reflected rays.

4. A photographic light reflector adapted to be mounted at the front of a camera relative to the lens aperture to reflect light rays forwardly along the lens axis from a light source to the subject being photographed, the reflected rays being projected from points surrounding the lens, said photographic light reflector comprising, an elongated reflector shell having a rear wall and having a side wall extending outwardly from the periphery of said rear wall and delineating an open face, said reflector shell having internal light reflecting surfaces facing outwardly, an opaque lens baffle means on said rear wall adapted to surround the camera lens, and to shield the lens from the entry of light rays which project from the reflecting surfaces of the reflector shell, said baffle means being located in an endwise portion of the elongated reflector shell, said reflector shell having a reflecting area surrounding the lens baffle means and projecting light rays outwardly toward the subject, the side wall at said endwise portion of the shell passing around said lens baffle means and spaced outwardly therefrom, thereby providing one portion of said reflecting area which surrounds the lens baffle means, a baffle plate extending across the open face of the elongated reflector shell at an endwise portion thereof opposite said first mentioned endwise portion, said plate having an edge spaced from the lens baffle means, a light source in said endwise portion of the shell behind said baffle plate, said baffle plate completely overlying and concealing the light source and delineating a light chamber which communicates with the reflecting area surrounding the lens baffle means, said light source projecting light rays laterally to the light reflecting areas surrounding the lens baffle means, said reflecting area projecting the reflected rays forwardly and generally along the axis of the lens baffle means and lens, said reflector shell, lens baffle means and baffle plate forming an enclosure about the light source eliminating the projection of direct rays from the source, whereby the subject being photographed is illuminated only by said reflected rays.

References Cited in the file of this patent

UNITED STATES PATENTS

| Number | Name | Date |
|---|---|---|
| 1,601,111 | Crowell | Sept. 28, 1926 |
| 1,736,012 | Parcell | Nov. 19, 1929 |
| 2,290,793 | Alderman | July 21, 1942 |
| 2,501,405 | Noel | Mar. 21, 1950 |
| 2,550,698 | King et al. | May 1, 1951 |
| 2,614,783 | Spear | Oct. 21, 1952 |
| 2,682,603 | Dine et al. | June 29, 1954 |

OTHER REFERENCES

"Shadowless Reflector," in Popular Mechanics, March 1950.